3,309,222
POLYESTERS OR POLYCARBONATES COATED WITH CURED UNSATURATED POLYESTER RESINS CONTAINING NITROGEN
John Richard Caldwell, Kingsport, Tenn., assignor to Eastman Kodak Company, Rochester, N.Y., a corporation of New Jersey
No Drawing. Filed Dec. 9, 1963, Ser. No. 329,303
13 Claims. (Cl. 117—138.8)

This application is a continuation-in-part of my co-pending application Serial No. 104,547, filed April 21, 1961.

This invention relates to the treatment of polyester films, fibers and other products which are normally resistant to the permanent reception of other polymeric materials and to coloring or dyeing with various dyes, pigments, printing inks and the like. More particularly, the invention relates to a polyester film, fiber or other product having adhesively joined thereto a thin layer of nitrogen-containing alkyd type polyester resin in which the nitrogen is present as an amide group or as a tertiary amine group and susceptible of permanently receiving dyes, pigments, printing inks, gelatin and the like.

It is known to coat polyester sheets, films and the like with resinous compositions to render the surface of such films receptive of coatings of various organic materials. For example, in U.S. Patent 2,893,896 it has been proposed to coat the surface of a polyethylene terephthalate sheet or film which has a normally hydrophobic, chemically inert surface with a halogenated fatty acid dissolved in an inorganic solvent followed by heating to a temperature of 100–300° F. The resulting sheet is said to be susceptible of receiving various coatings to make it useful as a drawing paper or medium and also to receive photosensitive coatings based on gelatin. Similarly, in U.S. Patent 2,874,046 there is described a method of subbing a film support derived by the condensation of terephthalic acid and a glycol to render it susceptible of receiving a photo-sensitive layer by applying to the support a sub consisting of an unsaturated polyester of an aromatic compound with two aliphatically bonded hydroxy groups and unsaturated dicarboxylic acids. Likewise, British Patent 770,766 describes the application to the surface of a polyester film or fiber of an unsaturated alkyd type resin. The application of alkyd type resins to polyester surfaces as disclosed in this and other prior art will not impart hydrophilic properties because it is well known that the alkyd resins are fundamentally hydrophobic in nature. Furthermore these alkyd resins have little or no affinity for many types of coloring agents represented by acid wool dyes, basic dyes and mordant type dyes. It is thus apparent that coatings of this type have severe limitations.

This invention has as an object to provide a new type of polymeric coating for a polyester film, fiber or other shaped object, which coating can permanently receive various dyes, pigments and other coloring matter.

Another object is to provide a new and improved coating for polyester films, fibers and the like which renders such products susceptible of subbing, sizing or coating with gelatin and poly(vinyl alcohol)-containing compositions.

Another object is to provide a new and improved type of sizing or finishing composition for polyester films and fibers which will improve the printability and dyeability of such films and fibers.

Another object is to provide a means of permanently associating with a normally hydrophobic polyester film, fiber or the like, a hydrophilic material which is normally incompatible therewith.

A further object is to provide high-melting crystalline linear polyester films, fibers and the like having greatly improved receptivity toward such substances as dyes, pigments, printing inks, gelatin and poly(vinyl alcohol)-containing coating or subbing compositions.

Other objects will appear hereinafter.

These objects are accomplished by the following invention which comprises applying to the surface of a normally hydrophobic, solvent-resistant, high-melting, crystalline polyester film, fiber or other shaped object a polymeric coating comprising a nitrogen-containing, unsaturated alkyd-type polyester resin and subsequently curing the unsaturated polyester material to an insoluble, cross-linked structure. As will be more fully set forth hereinafter, in such a polyester, the nitrogen is present as an amide group or as a tertiary amine group. It has been found that certain types of unsaturated polyesters that contain nitrogen in these forms have unexpectedly good adhesion when applied to fibers and films made from high-melting, crystalline polyesters. The nitrogen in the polymer furnishes active sites for the attachment of dyes, metal ions, poly(vinyl alcohol), gelatin and acidic polymers. According to one embodiment of the invention, an unsaturated polyester resin of the alkyd type derived by the interaction of a glycol with maleic or fumaric acid and a nitrogen-containing difunctional compound is employed. In another embodiment of the invention, the unsaturated polyester resin is derived from the interaction of polyhydric alcohol allyl ethers, a dicarboxylic acid and a nitrogen containing difunctional compound.

The polyester material which can be coated or sized by the present invention to render the material permanently receptive of dyes, inks and other materials and also susceptible of the satisfactory deposition thereon of gelatin and poly(vinyl alcohol) containing layers such as subs or gelatino-silver halide emulsions and of various textiles sizing compositions containing gelatin, resins and other materials, are those commonly employed for the manufacture of textile fibers and for the production of photographic films, sheets, molded objects and other products. However, the polyesters treated in accordance with this invention can be most advantageously derived from terephthalic acid, 4,4'-sulfonyldibenzoic acid, 4,4'-diphenic acid, 1,2-di(p-carboxyphenoxy)-ethane, 4,4'-dicarboxy-diphenyl ether, naphthalenedicarboxylic acids and the various esters of these acids such as the lower alkyl diesters. These compounds can be generically grouped as hexacarbocyclic nuclear dicarboxylic bifunctional compounds wherein the carboxyl radicals are nuclearly situated in a para relationship. To produce such polyesters such compounds can be reacted in accordance with well-known techniques described in numerous issued patents, with bifunctional glycols containing from about 2 to about 10 carbon atoms. Examples of such glycols include ethylene glycol, tetramethylene glycol, 2,2,4,4 - tetra - alkyl - 1,3 - cyclobutanediols, pentamethylene glycol, neopentylene glycol, 1,4-cyclohexanedimethanol, quinitol, 1,4-bis(hydroxy ethyl)benzene, etc. Illustrative of the more advantageous polyesters are poly(ethylene terephthalate), the polyester from pentamethylene glycol and 4,4'-sulfonyldibenzoic acid, the polyester from 1,4-cyclohexanedimethanol and terephthalic acid and various modified polyesters related thereto, e.g., those wherein up to 30 mole percent of another aromatic dicarboxylic acid or an aliphatic dicarboxylic acid is employed as a modifier.

Polyesters which give outstandingly superior products when mixed with or coated on and fused with the nitrogen-containing, unsaturated alkyd-type polyesters herein described, in accordance with the invention, are those prepared by reacting 1,4-cyclohexanedimethanol with one or more aromatic dicarboxylic acids such as terephthalic acid.

Another valuable class of polyesters that can be successfully treated by the process of the invention are those obtained from compounds that contain 2 aromatic hydroxy groups. These include the polycarbonates and dicarboxylic acid polyesters of compounds containing 2 aromatic hydroxy groups having the structure

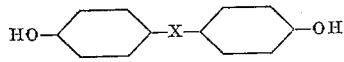

where X is an alkylene or cyclic alkylene radical.

Such polymers and their preparation are described in Angewandte Chemie, 68, 633 (1956).

As will be more fully set forth hereinafter, the two types of unsaturated, nitrogen-containing alkyd-type polyester resins referred to above and employed in accordance with the invention may be prepared by methods well known to the art to which this invention relates. The first type of unsaturated polymers may be prepared by heating the three reactants, i.e. a glycol, an unsaturated acid and the nitrogen-containing difunctional compound, at a temperature within the range of 180–250° C. in an inert atmosphere such as nitrogen and in the presence of a suitable catalyst such as a compound of aluminum, tin, titanium, zirconium, magnesium and the like. If desired, reduced pressure can be employed during the later stages of the reaction.

For the production of these polyesters, suitable glycols include propylene, tetramethylene, trimethylene, diethylene, triethylene, etc. Branched chain or cyclic glycols such as 2,2-dimethyl-1,3-propanediol, 1,4-cyclohexanedimethanol, 1,3-cyclohexanedimethanol, 2,2,4,4-tetra-alkyl-1,3-cyclobutanediols, norcamphanediols, etc., may also be employed. The unsaturated acids which have been found suitable for the production of such polyesters are maleic and fumaric acids.

Polyesters of the second type, that is, unsaturated polyesters derived from the interaction of a polyhydric alcohol allyl ether, a dicarboxylic acid and a nitrogen-containing difunctional compound and employable in accordance with the invention, may be prepared in accordance with the general procedure described in U.S. Patent 2,488,258. The modification of the polyesters disclosed in this patent by the inclusion of a nitrogen-containing reactant is not disclosed in the patent but the general procedure employed is the same notwithstanding the use of the additional nitrogen-containing reactant. Suitable acids include succinic, adipic, o-phthalic, isophthalic, terephthalic, cyclohexane-1,4-dicarboxylic, cyclohexane-1,3-dicarboxylic, bicycloheptane-2,3-dicarboxylic, and mixtures of these and related acids. Other glycols may be used to the extent of 10–40 mole percent. Unsaturated acids may be used as represented by maleic, fumaric, cyclohexene-1,2-dicarboxylic and bicycloheptene-2,3-dicarboxylic. Suitable polyhydric alcohol allyl ethers are compounds that contain two aliphatic hydroxyl groups and one or two allyl groups, as represented by glycerine α-allyl ether, 2-methyl-2 - allyloxymethyl - 1,3-propanediol and 2,2-di(allyloxymethyl)-1,3-propanediol.

As indicated above, the nitrogen-containing difunctional compound has a structure such that an amide group or a tertiary amino group is incorporated into the unsaturated polyester molecule. The third reactant is therefore selected in accordance with the invention from one of the following categories of material which have been found useful for this purpose.

(a) Diamines having the structures $H_2N-R-NH_2$ where R is selected from the following structures (1) A straight chain or branched chain alkylene radical containing 2 to 12 carbon atoms (2) An arylene or cycloalkylene structure containing 6 to 12 carbon atoms such as

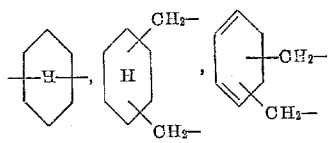

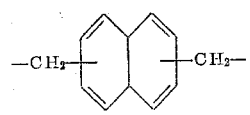

(b) Diamines containing ether groups such as those represented by 3,3′-oxybis(propylamine) and $$H_2NC_3H_6-O-R'-O-C_3H_6NH_2$$

where R′ is a branched chain, straight chain or cyclic alkylene group containing from 2–10 carbon atoms.

(c) Amino alcohols having the structure $H_2N-R-OH$ where R has the significance defined in (a) above.

(d) Amino acids having the structure $$H_2N-R-COOH$$

where R has the significance defined in (a) above.

(e) Dicarboxylic acids containing a tertiary amino group as represented by the dicarboxy derivatives of pyridine. Other acids of this type include 3,3′-(methylimino)dipropionic acid $[(HOOCCH_2CH_2)_2NCH_3]$ and 3,3′-(ethylimino)diacetic acid $[(HOOCCH_2)_2NC_2H_5]$.

(f) Dihydroxy compounds that contain a tertiary amino group as represented by 2,2′-(methylimino)diethanol $[(HOC_2H_4)_2NCH_3]$, 3,3′-(ethylimino)di - 1 - propanol $[(HOC_3H_6)_2NC_2H_5]$, and 2,2′-(phenylimino)diethanol $[(HOCH_2CH_2)_2NC_6H_5]$.

The unsaturated polyesters prepared as indicated above contain from about 0.4 percent to about 5 percent and preferably 1 to 3 percent of nitrogen in the form of tertiary-amino groups or carboxamide groups.

The unsaturated alkyd-type polyesters referred to above are conveniently applied to polyester films, fibers and other shaped objects from solutions in various solvents such as alcohol, ethyl acetate, toluene, methylene chloride, ethylene dichloride, and dioxane or various mixtures thereof. The polyesters may also be emulsified in water by methods known to the art and applied to the polyester film, fiber or other object as a dispersion. The application of such solutions or emulsions may be accomplished in any convenient manner as by spraying, application by applicator rolls, immersion or other well-known techniques. It should be noted in this connection that only by solution application can extremely thin layers or coatings be deposited on such objects as films or fibers. Regardless of the method of deposition of the unsaturated polyester material, the treated polyester product is heated to drive off the solvent and to effect cross-linking in the deposited polyester resin. Cross-linking may also be effectuated by means of peroxide catalyst added to the unsaturated polyester resin solution, if desired. Likewise, the deposited resin may be cured by heating in air in the presence of manganese or cobalt compounds such as oleate or naphthenate salts of these metals.

As to the matter of depositing or coating the unsaturated alkyd polyester resin on a polyester surface and the curing of the deposited layer to form a firm coating on the treated object, it is one of the unusual features of our invention that the unsaturated polyester resin can be made to adhere to the polyester surface to which it is applied merely by heating to drive off the solvent and to cure or insolubilize the deposited resin layer. This is a most unusual and unexpected effect, particularly when it is taken into consideration that the solvent medium employed has no solvating, swelling or etching effect on the polyester surface to which the solution is applied. Nevertheless, a firm and permanent bond is formed between the deposited unsaturated polyester and the polyester surface to which it is applied.

In the following examples and description I have set forth several of the preferred embodiments of my invention but they are included merely for purposes of illustration and not as a limitation thereof.

*Example I*

The following materials were placed in a flask equipped with a stirrer, a distillation column and an inlet for purified nitrogen: 17.5 g. adipic acid, 7.8 g. maleic anhydride, 25.5 g. triethylene glycol, 4.76 g. N-methyldiethanolamine and 0.05 g. dibutyltin oxide catalyst. The mixture was stirred in a nitrogen atmosphere at 180–200° for 2 hours. The temperature was then raised to 220° and stirring was continued for 1.5 hours. When cool, the product was a stiff gum, soluble in the lower alcohols, esters, ketones, chlorinated hydrocarbons and aromatic hydrocarbons.

A. Four g. of the unsaturated polyester was dissolved in 100 cc. of methylene chloride and traces of cobalt naphthenate and manganese naphthenate were added to the solution. Polyethylene terephthalate films, which had been drafted and heat-set, were coated with the solution to give a coating 0.3–0.5 mil. thick, after drying. The films were heated at 110° C. for one hour to cure the coating. A polyester made from terephthalic acid and 1,4-cyclohexanedimethanol was converted into drafted, heat-set films and coated in the same way.

The treated films were placed in a bath containing an acid wool dye, Acid Violet (C.I. No. 57). The dye bath also contained acetic acid and sodium sulfate. After 30 minutes in the dye bath at 90–100°, the film was dyed a deep violet color. Similar dye take up was obtained with Acid Red 33 (C.I. No. 30), Acid Yellow 36 (C.I. No. 138) and Acid Blue 9 (C.I. No. 671). The coating was not removed by bending or creasing the film. Films that were coated with a polyester made from adipic acid, maleic acid and triethylene glycol (the N-methyldiethanolamine was omitted) were only slightly tinted by the dye solutions listed above. This shows that the tertiary amino group was responsible for the dye affinity.

The coated films also showed greatly improved receptivity toward printing inks. The adhesion for gelatin and polyvinyl alcohol coatings was excellent. Polymers containing free carboxyl groups, such as polyacrylic acid, had improved adhesion.

B. A fabric made from terephthalic acid-cyclohexanedimethanol polyester was printed with the solution of unsaturated polyester. After curing, the treated fabric was immersed in a dye bath of Acid Yellow 36. The printed areas were dyed yellow.

The fabric was immersed in a 2 percent solution of chromium chloride for 15 minutes, then rinsed and dried. The coating took up chromium ions from the solution, as was shown by a pale green color. The fabric could then be dyed with chrome mordant dyes.

C. A fabric made from polyethylene terephthalate was treated with the solution to given an add-on of 1–1.5 percent on a dry basis. After curing, the fabric dyed well with acid dyes. This coating was further modified by quaternization. A solution of methyl toluenesulfonate in alcohol was sprayed on the coated fabric and the fabric was then heated at 90–100° for 2 hours. During this time the methyl toluenesulfonate reacted with the tertiary amino groups to give a quaternary salt. The fabric had improved antistatic properties.

D. A polyester was prepared from 1 mole of ethylene glycol, .8 mole terephthalic acid and .2 mole isophthalic acid. A fabric made from this fiber was treated as described in B with the same results.

*Example II*

An unsaturated polyester was made from 1.0 mole of adipic acid, 0.80 mole glycerine α-allyl ether and 0.20 mole of a diamine having the structure

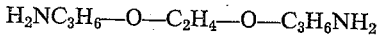

A. A solution of the unsaturated polyester in dioxane was applied to a polyester fabric to give an add-on of 2 percent, on a dry basis. The solution also contained a trace of cobalt oleate and benzoyl peroxide as curing catalysts. The polyester was made from pentamethylene glycol and 4,4′-sulfonyldibenzoic acid. After curing at 130° for 30–40 minutes, the coated fabric dyed well with acid wool dyes. It also had greatly improved adhesion for coatings of rubber, Neoprene, poly(vinyl butyral) and poly(vinyl chloride).

B. A polyester film was treated with the solution to give a coating 1.0 mil. thick, on a dry basis. The polyester was made from 1,2-di(4-carboxyphenoxy)ethane and ethylene glycol. After curing, the treated film had excellent adhesion for coatings of gelatin, poly(vinyl alcohol) and casein. It could be printed with a wide variety of inks.

C. Similar results were obtained when the coating was applied to a film made from Bisphenol A polycarbonate prepared as described in Angew. Chem., 68, 633 (1956).

D. Equivalent results were obtained when the coating was applied to a film made from the polyester having the composition 0.7 mole terephthalic acid and 0.3 mole succinic acid and 1 mole of 1,4-cyclohexanedimethanol.

*Example III*

A polyester was made from 0.70 mole of o-phthalic acid, 0.30 mole of 2,5-pyridinedicarboxylic acid and 1.0 mole of glycerine α-allyl ether.

A. A solution of the polyester in toluene-alcohol mixture was prepared and a trace of manganese oleate was added. The solution was applied to a fabric made from terephthalic acid-cyclohexanedimethanol-1,4 polyester to give an add-on of 1 to 2 percent, based on the weight of the fabric. After curing at 120–130° for 30 minutes, the treated fabric dyed well with acid wool dyes. When quaternized with benzyl chloride, ethyl toluene-sulfonate, or diethyl sulfate, the treated fabric had improved antistatic properties.

B. A polyester film made from 4,4′-diphenic acid and tetramethylene glycol was treated with the solution to give a coating 0.5–0.6 mil. thick, on a dry basis. After curing at 150° for 15–20 minutes, the film dyed heavily with acid dyes. Polymers containing carboxyl groups had excellent adhesion when coated in thins layers on the treated film.

*Example IV*

A polymer was made from 0.75 mole sebacic acid, 0.75 mole glycerine α-allyl ether and 0.25 mole 6-aminocaproic acid. Polyester films and fibers coated with the polymer and cured had improved adhesion for printing inks. Polyester films coated with the polymer, and cured, had improved adhesion for gelatin and poly(vinyl alcohol).

*Example V*

The following materials were placed in a flask: 16.6 g. isophthalic acid, 11.9 g. glycerine α-allyl ether, 1.22 g. monoethanolamine and 0.05 g. dibutyltin diacetate. The mixture was stirred in a nitrogen atmosphere at 200° for 2 hours and water was removed by distillation. The temperature was then raised to 220° and stirring was continued for 1 hour. A vacuum of 0.1 mm. was then applied for 15–20 minutes. When cool, the product was a brittle glass.

A. A solution was made by dissolving 4 g. of the polyester and 0.05 g. cobalt naphthenate in 100 cc. of methylene chloride. Polyester films were coated with the solution to give a layer 0.3–0.6 mil. thick, on a dry basis. After curing at 120° for 30 minutes, the treated films had excellent adhesion for coatings of gelatin and poly(vinyl alcohol). The films were made from polyethylene terephthalate.

B. A fabric made from terephthalic acid-cyclohexanedimethanol-1,4 polyester was treated with the solution to give an add-on of 0.5 to 1.0 percent, on a dry basis. After curing at 120° for 30–40 minutes, the fabric had excellent adhesion for coatings of natural rubber, butadiene-styrene rubber, Neoprene, poly(vinyl butyral) and poly(vinyl chloride).

*Example VI*

A polymer was made from 1.0 mole of adipic acid, 0.8 mole of 2-methyl-2-allyloxymethyl-1,3-propanediol and 0.2 mole of N-phenyldiethanolamine.

The polymer was applied to polyester fibers and films as described in Examples I and II. The treated products dyed well with acid dyes.

*Example VII*

An unsaturated polymer was made from 0.7 mole of fumaric acid, 0.3 mole of $(HOOCCH_2)_2NCH_3$ and 1.0 mole of hexamethylene glycol. It was used as described in Examples I and II. The treated products had improved adhesion for printing inks and decorative coatings.

As will be evident from the preceding description, the present invention makes possible the coating of various polyester materials such as sheets, films, fibers and molded and other shaped objects with a thin layer of a material which adapts such products for the application thereto of other coatings such as gelatin, polyvinyl alcohol and the like and also renders the material susceptible of permanent dyeing by acid wool dyes and other coloring materials such as printing inks. Polyester fibers coated with the nitrogen-containing unsaturated polyesters of the invention may thus be successfully sized with gelatin-containing sizing solutions or permanently dyed with acid wool dyes. Films coated with the nitrogen-containing unsaturated polyesters of the invention can be readily coated with subs and other compositions containing gelatin, polyvinyl alcohol and the like. A polyester film coated with such polyesters may be employed as a photographic film base and coated directly with a gelatino-silver halide layer from an emulsion thereof. Many other advantages and uses of the invention will be apparent to those skilled in the art.

Although the invention has been described in considerable detail with particular reference to certain preferred embodiments thereof, variations and modifications can be effected within the spirit and scope of the invention as described hereinabove, and as defined in the appended claims.

I claim:

1. A coated object comprising (A) a shaped object consisting essentially of a high-melting crystalline linear polyester selected from the group consisting of bisphenol polycarbonates and polyesters of (a) diols and (b) dicarboxylic bifunctional compounds consisting essentially of hexacarbocyclic nuclearly attached dicarboxylic bifunctional compounds wherein the carboxy radicals are nuclearly situated in a para relationship or dicarboxylic bifunctional naphthalene compounds, and (B) a cured unsaturated polyester resin coating on said shaped object having a composition consisting essentially of a polyhydric alcohol constituent, a polycarboxylic acid constituent and a nitrogen containing constituent having two functional radicals selected from the group consisting of hydroxy, carboxy and amino groups attached to an organic radical whereby said unsaturated polyester resin has carboxyamide groups or tertiary amino groups in its structure in an amount such that the unsaturated polyester resin contains from 0.4 to 5% nitrogen by weight, as to which unsaturated polyester constituents any unsaturated acid constituent constitutes at least 30 mole percent of the polycarboxylic acid consituent and any unsaturated alcohol constituent constitutes a least 40 mole percent of the polyhydric alcohol constituent.

2. A coated object as defined by claim 1 in which the unsaturated polyester constituents are at least one glycol and at least one dicarboxylic acid of which at least 30 mole percent is maleic acid or fumaric acid.

3. A coated object as defined by claim 1 in which the unsaturated polyester constituents are at least one dicarboxylic acid and at least one glycol, said glycols including a glycol containing two hydroxy radicals and at least one allyloxy radical.

4. A coated object as defined by claim 1 in which the high-melting crystalline linear polyester consists essentially of poly(ethylene terephthalate).

5. A coated object as defined by claim 1 in which the high-melting crystalline linear polyester consists essentially of poly(1,4-cyclohexanedimethylene terephthalate).

6. A coated object as defined by claim 1 in which the nitrogen containing constituent is N-methyldiethanolamine.

7. A coated object as defined by claim 1 in which the nitrogen containing constituent is a diamine having the formula $H_2NC_3H_6—O—C_2H_4—O—C_3H_6NH_2$.

8. A coated object as defined by claim 1 in which the nitrogen containing constituent is 2,5-pyridinedicarboxylic acid.

9. A coated object as defined by claim 1 in which the nitrogen containing constituent is 6-aminocaproic acid.

10. A coated object as defined by claim 1 in which the nitrogen containing constituent is monoethanolamine.

11. A coated object as defined by claim 1 in which the nitrogen containing constituent is N-phenyldiethanolamine.

12. A coated object as defined by claim 1 in which the nitrogen containing constituent is a compound having the formula $(HOOCCH_2)_2NCH_3$.

13. A coated object as defined by claim 1 in which the polyhydric alcohol constituent includes glycerine 2-allyl ether.

References Cited by the Examiner

UNITED STATES PATENTS

| | | | |
|---|---|---|---|
| 2,650,207 | 8/1953 | Rust et al. | 260—873 |
| 2,802,714 | 8/1957 | Olpin et al. | 8—18 X |
| 2,803,607 | 8/1957 | Stroh et al. | 117—138.8 X |
| 2,865,891 | 12/1958 | Michel | 117—138.8 X |
| 2,882,255 | 4/1959 | Caldwell et al. | 260—873 |
| 2,901,466 | 8/1959 | Kibler et al. | |
| 2,914,498 | 11/1959 | Quarles et al. | |
| 2,933,416 | 4/1960 | Haakh et al. | 117—38 X |
| 2,955,958 | 10/1960 | Brown | 117—113 |
| 2,996,475 | 8/1961 | Joyner et al. | 260—873 |
| 3,034,920 | 5/1962 | Waller et al. | 117—138.8 X |
| 3,128,265 | 4/1964 | Caldwell | 117—138.8 X |

FOREIGN PATENTS 846,505   8/1960   Great Britain.

WILLIAM D. MARTIN, *Primary Examiner.*

T. G. DAVIS, *Assistant Examiner.*